June 25, 1957 A. HALTMEIER 2,797,073
HEATING OF FLOWING LIQUIDS BY THE INJECTION OF VAPOR
Filed Dec. 13, 1954
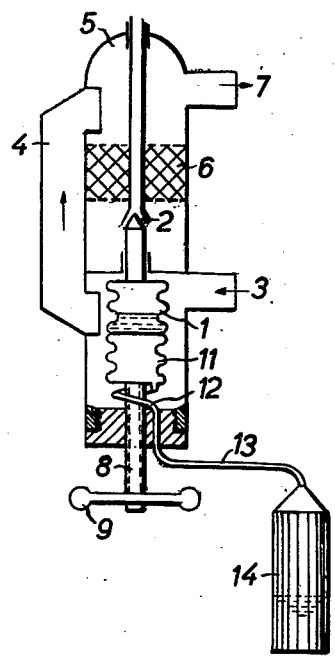
INVENTOR.
ALFRED HALTMEIER
BY *Burgers and Dinklage*
ATTORNEYS

United States Patent Office 2,797,073
Patented June 25, 1957

2,797,073

HEATING OF FLOWING LIQUIDS BY THE INJECTION OF VAPOR

Alfred Haltmeier, Leverkusen-Bayerwerk, Germany, assignor to Farbenfabriken Bayer Aktiengesellschaft, Leverkusen, Germany, a corporation of Germany Application December 13, 1954, Serial No. 474,914

Claims priority, application Germany December 14, 1953

3 Claims. (Cl. 261—39)

This invention relates to the heating of flowing liquids by the injection of vapor.

In my copending application Ser. No. 383,560, which was filed October 1, 1953, and now abandoned, I have described an apparatus for the controllable heating of flowing liquids by injection of vapor, in which the supply of vapor is controlled in dependence on the admission temperature of the liquid: once it is set, this apparatus maintains the temperature of the liquid substantially constant. However, in many cases the problem is not to keep the liquid temperature constant, but to bring it into a given relationship with another temperature, for example, the ambient temperature which fluctuates according to the time of day.

It has now been found that this modified problem may be solved in a very simple manner if the supply of vapor is not only controlled in dependence on the admission temperature of the liquid, but is additionally controlled in dependence on another temperature, preferably the ambient temperature. Controlling impulses from outside are, therefore, added to the impulses resulting from the admission temperature of the liquid.

It is expedient to arrange that a throttle member for the injected vapor is additionally actuated by a resilient tube or bellows in communication with a container which has a large surface, and contains a liquid giving off vapor or gas, and is influenced by an ambient temperature. The two resilient tubes or bellows influenced by different temperatures may be superimposed one on the other, or they may be caused to act simultaneously on the throttle member for the injected vapor, for example, by means of a linkage with adjustable components.

The accompanying diagrammatic drawing is a sectional view of a regulating device basically the same as the device illustrated in Figure 1 of the drawings accompanying my abovesaid copending application Ser. No. 383,560, but modified in accordance with the present invention.

In the device illustrated, two superimposed resilient tubes or bellows 1 and 11 are arranged to control a steam valve 2. Water to be heated is admitted to a container through an inlet 3 and passes through a pipe 4 into a space 5 in which it is heated by steam controlled by the valve 2 and by hot water circulating in a cylindrical filling 6. Heated water is discharged through an outlet 7. The steam can be controlled manually by a handwheel 9 acting through a screw spindle 8. The tube or bellows 1 is charged with a liquid giving off vapor or gas, which liquid causes the bollows to contract when exposed to low temperature and to expand when exposed to high temperature. Thus, the bellows is influenced by the admission temperature of the liquid, while the second tube or bellows 11 is connected by an elastic tubular element 12 and a pipe 13 to a container 14, which is, for example, star-shaped in cross-section. This container 14 contains a liquid which gives off a vapor or gas and the pressure of which, dependent on another temperature, for example, ambient temperature, influences the resilient tube or bellows 11 by modifying the shape of the latter. Impulses from the two tubes or bellows are added together to control the steam valve 2.

I claim:
1. In a device for heating a flowing liquid having a liquid inlet compartment, a liquid heating compartment in which the liquid to be heated is contacted with a heating vapor and means connecting said inlet compartment with said heating compartment for the passage of liquid from said inlet compartment to said heating compartment, throttling means for independently regulating the passage of heating vapor into said heating compartment, the improvement which comprises control means for control actuation of said throttling means actuated by a first and second temperature-responsive means, in which said control means comprises 2 pressure-tight, expansible containers connected in tandem to said throttle valve, one of said containers containing a temperature-responsive fluid enclosed therein and comprising said first temperature-responsive means, the interior of the other container being connected by a conduit to a pressure-tight container containing a liquid-responsive to changes of temperature, said first temperature-responsive means being positioned in said inlet compartment and said second temperature-responsive means being remotely positioned outside said compartments, whereby variations in temperature of a liquid in said inlet compartment and variations in temperature at the place of said second temperature-responsive means will result in variations in the amount of heating vapor passed into said heating compartment.

2. Improvement in accordance with claim 1, in which said pressure-tight containers are in the form of bellows and contain a low-boiling liquid.

3. Improvement in accordance with claim 1, which includes injecting means regulated by said throttling means for injecting heating vapor into said heating compartment.

References Cited in the file of this patent

UNITED STATES PATENTS

| | | |
|---|---|---|
| 1,530,917 | Snediker | Mar. 24, 1925 |
| 1,788,765 | Hamblin et al. | Jan. 13, 1931 |
| 1,985,929 | Jorgensen et al. | Jan. 1, 1935 |
| 2,277,314 | Gallagher | Mar. 24, 1942 |
| 2,407,036 | Snavely | Sept. 3, 1946 |
| 2,455,498 | Kern | Dec. 7, 1948 |